United States Patent [19]
Pearson

[11] 3,886,479
[45] May 27, 1975

[54] ELECTRODE SYSTEMS FOR GAS DISCHARGE DEVICES PARTICULARLY GAS LASERS

[75] Inventor: Peter Reginald Pearson, Baldock, England

[73] Assignee: National Research and Development Corporation, London, England

[22] Filed: Nov. 23, 1971

[21] Appl. No.: 201,455

[30] Foreign Application Priority Data
Dec. 4, 1970  United Kingdom.............. 57848/70

[52] U.S. Cl. ............ 331/94.5 G; 330/4.3; 313/197; 313/198; 331/94.5 PE
[51] Int. Cl. ......................... H01s 3/22; H01s 3/09
[58] Field of Search ............ 313/197, 198; 331/94.5

[56] References Cited
UNITED STATES PATENTS

| 3,067,353 | 12/1962 | Frouws | 313/198 |
| 3,621,458 | 11/1971 | Cabezas et al. | 331/94.5 |
| 3,646,476 | 2/1972 | Barker et al. | 331/94.5 |
| 3,657,600 | 4/1972 | Wiegand, Jr. | 313/197 X |
| 3,662,284 | 5/1972 | Beaulieu et al. | 331/94.5 |

OTHER PUBLICATIONS

Beaulieu, "A New Generation of High Power Lasers," DREV unclassified Report M–2005/70, January, 1970, pp. 1–7.
Dumanchin et al., C. R. Acad. Sci. de Paris, Vol. 269, Series B, 3 Nov. 1969, pp. 916–917.

Primary Examiner—Robert J. Webster
Attorney, Agent, or Firm—Kemon, Palmer & Estabrook

[57] ABSTRACT

An electrode system in which a uniform discharge between a pair of main electrodes is initiated by one or a plurality of auxiliary discharges originating from one or more auxiliary electrodes outside the line of centres of the main electrodes. The auxiliary electrodes are arranged to provide a field concentration in their vicinity. Particularly suitable for use as auxiliary electrodes are wires, rows of pins, and sharp metallic edges.

16 Claims, 10 Drawing Figures

ELECTRODE SYSTEMS FOR GAS DISCHARGE DEVICES PARTICULARLY GAS LASERS

This invention relates to electrode systems employed in gas discharge devices; it is normally used in the production of uniform pulsed discharges within gas lasers and is particularly suitable for, although not restricted to, atmospheric pressure carbon dioxide lasers.

Until recently the highest power outputs from lasers have been obtained at a wavelength of 1.06 $\mu$m from neodymium ions in a crystal or glass host material. In particular, the ease of manufacture of neodymium loaded glass has made it possible to use large glass rods and correspondingly high pulsed outputs have been obtained using a number of amplifiers in series. Neodymium ions have also been used in liquids such as phosphorus oxychloride. Circulation of the liquid through the optical cavity is an effective way of increasing the permissible power dissipation in the laser and has resulted in high mean powers. However, all these developments have been surpassed in recent years by the gas laser in particular the carbon dioxide laser, which gives an output in the mid infra-red at 10.6 $\mu$m.

The first gas lasers, such as the helium-neon laser, relied on transitions between excited states of the atom, with saturation limiting the output power to a few hundred milliwatts. The saturation problem does not exist in ion lasers such as the argon-ion laser, but its very low efficiency (0.1 per cent) limits the practically realisable power levels to a few watts. However, it has been shown that stimulated emission could be obtained from molecules with transitions between the vibrational levels. Since these levels are close to the ground state, high efficiencies are attainable in principle. The most efficient molecular gas laser is the carbon dioxide laser. This laser has now been developed in a number of forms to give mean powers well in advance of the other types of laser and peak powers of comparable levels but with far higher efficiencies.

The usual active medium of the $CO_2$ laser is an electrically excited mixture of carbon dioxide, nitrogen and helium and laser action occurs on a rotation-vibration transition of the ground electronic state of $CO_2$. The upper laser level is in precise energy resonance with the $\nu = 1$ level of nitrogen and as this latter level is readily excited by electron collision and is metastable it provides a very efficient, selective excitation mechanism for the upper laser level. This level can also be excited directly by electron collision. For efficient operation, the electrical conditions in the discharge must give the optimum mean electron energy. Strongest laser action occurs between the $\nu_3$ level and the $\nu_1$ level; the energy in the laser transition is about 40 per cent of the total energy of the upper laser level and this is an important contributory factor to the overall high efficiency of the laser. The lower laser level decays very rapidly by resonant collisional energy-sharing processes to the $\nu_2$ level and this in turn is collisionally de-excited to the ground state. The population of the $\nu_2$ level does not directly participate in the laser action but is nontheless crucially important and its de-excitation rate can be the rate limiting process in the laser cycle. If an appreciable population is allowed to build up in the $\nu_2$ level, it can impede the decay of the lower laser level and hence reduce laser action. Furthermore, since the $\nu_2$ level is only 2kT above the ground state, it is imperative that the gas kinetic temperature be kept low to prevent it becoming thermally populated. The reason for the presence of He in the gas mixture is that its high thermal conductivity helps to cool the gas, in addition to increasing the relaxation rate of the lower laser level.

This invention particularly relates to pulsed gas lasers.

The pulse energy attainable from a given volume of electrically excited $CO_2$ depends on the number of excited molecules present and so on the pressure. The pulse length is largely determined by the relaxation times of the molecular processes involved and so is inversely dependent on pressure. The peak pulse power is therefore proportional to the square of the pressure and very large increases in peak power can be attained by increasing the operating pressure of these lasers from the convential region below 70 Torr. Uniformity of the discharge is vital to the efficient operation of gas lasers. Ideally such uniformity requires that the discharge takes place in a region of uniform field. The classical method of producing such a field is to employ a pair of plane parallel electrodes, suitably profiled at the edges so that the field decreases uniformly in all directions away from the uniform field region. This profiling is required to ensure that there are no localised regions of high field ensuring that the discharge takes place only in the uniform field region; it is generally accepted that Rogowski profiles are ideal, although not mandatory. However, at pressures above about 100 Torr and at the fields required for efficient excitation of the laser gas such simple electrodes on their own result in a single localised arc.

A number of electrode configurations have been proposed to overcome this problem. One system employs a row of points as one main electrode; this system is, however, susceptible to arcing and produces inhomogeneous discharges. Another system uses a plane electrode and a mesh electrode which is separated from a parallel plane auxiliary electrode by thin sheets of dielectric material; this, in common with similar systems employing auxiliary electrodes separated from main electrodes by thin sheets of dielectric material, develops very high electric fields across the dielectric which tends to puncture it. It is an object of the present invention to overcome these disadvantages and difficulties.

According to the present invention, there is provided an electrode system for gas discharge devices comprising a pair of opposed parallel main electrodes, one or a plurality of auxiliary electrodes parallel to the main electrodes but outside the line of centers thereof, and a discharge initiation circuit, whereby application of a voltage pulse to the discharge initiation circuit causes a fast rise voltage pulse to appear between the main electrodes and in which said auxiliary electrodes initiate an auxiliary discharge and wherein said auxiliary discharge initiates a main discharge in the region between the main electrodes.

The auxiliary electrodes may be so shaped as to provide a field concentration in their region and it is desirable that they be arranged so as to cause negligible perturbation of the uniform field during the period of the main discharge.

Excitation of the main electrodes is provided by a fast rise voltage pulse applied between them. Excitation of the auxiliary electrodes may be derived from the excitation pulse to the main electrodes, to one of the main electrodes through capacitors. Other methods of exciting the auxiliary electrodes will be apparent to those skilled in the art. The auxiliary discharge may take place between the auxiliary electrodes and either the anode or the cathode of the main pair of electrodes. Auxiliary electrode systems for use with this invention include one or a plurality of wires parallel to the main electrodes, one or a plurality of sharp edges parallel to the main electrodes, one or a plurality of rows of pins parallel to the main electrodes, and one or a plurality of resistively loaded pins parallel to the main electrodes. All auxiliary electrodes are external to the center line of the main electrodes.

In a preferred embodiment of the present invention an electrode system for gas discharge devices comprising an identical pair of opposed Rogowski profiled main electrodes forming an anode and a cathode, a pair of tungsten wire auxiliary electrodes parallel to the main electrodes and disposed in a symmetrical arrangement in relation to and outside the centre line of the main electrodes, and a coupling capacitor between the pair of tungsten wire auxiliary electrodes and the main cathode, wherein application of a fast rise voltage pulse between the main electrodes initiates an auxiliary discharge between at least the auxiliary electrodes and the anode, whereby a main discharge in the region between the main electrodes is initiated.

An alternative arrangement provides that the auxiliary discharge should not touch the main electrodes at all. One or a plurality of sharp-edged auxiliary electrodes may be mounted to provide an auxiliary discharge to one or a plurality of further auxiliary electrodes. The auxiliary electrodes are mounted externally to the uniform field region of the main electrodes. A further arrangement in accordance with the invention provides that one or a plurality of rows of pins initiate auxiliary discharges to one or a plurality of rows of studs, these auxiliary electrodes being mounted externally to the uniform field region of the main electrodes.

The main electrodes employed in conjunction with this invention might be a pair of plain parallel electrodes profiled at their edges to insure that the field decreases uniformly in all directions away from the uniform field region. Rogowski profile electrodes would be the ideal but these are not mandatory.

In order that the invention might be more fully understood reference will now be made, by way of example only, to the accompanying drawings, in which:

FIG. 7b is a medial section on the line YY' of the electrode system of FIG. 7a;

Figure 1:
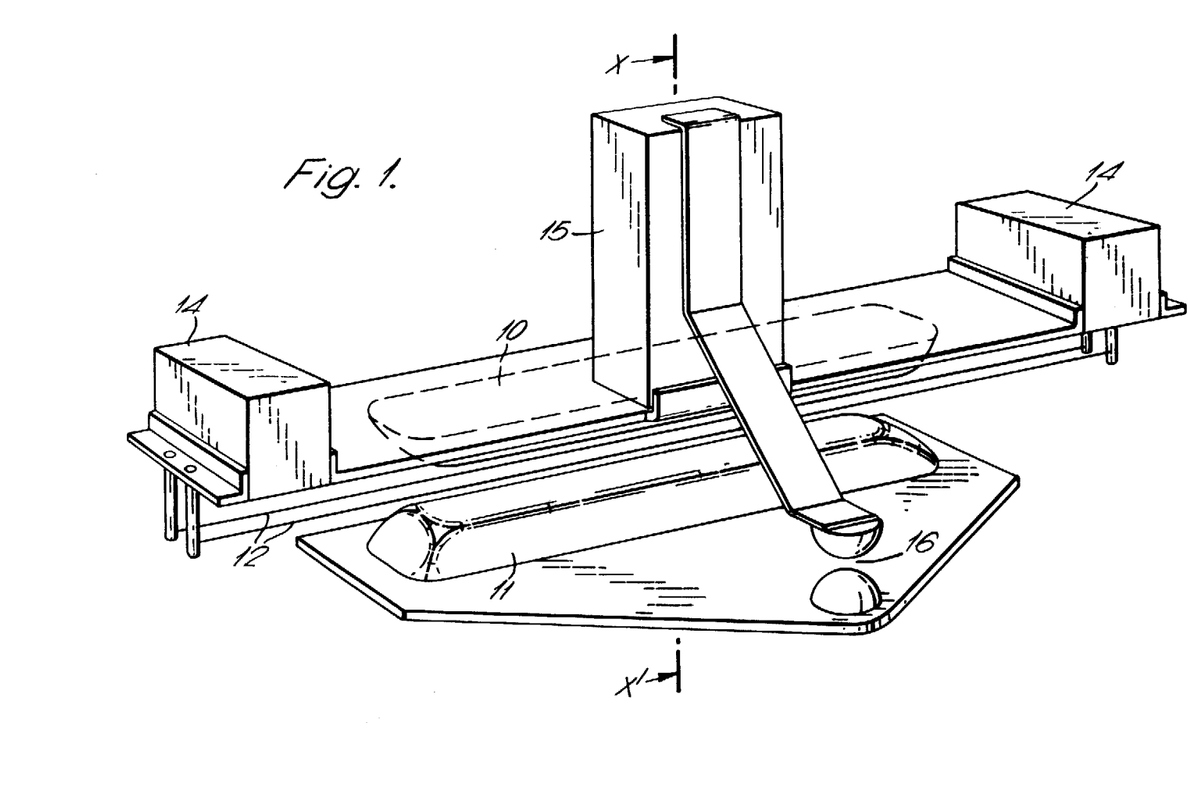
FIG. 1 shows a schematic perspective view of preferred electrode system in accordance with the invention.
Figure 2:
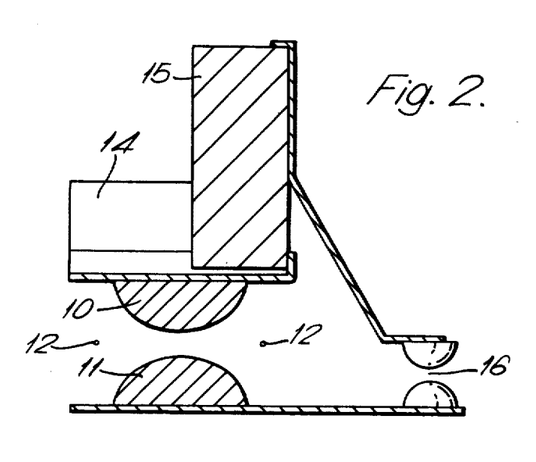
FIG. 2 is a medial section on the line XX' of the electrode system of FIG. 1.

Referring now to FIGS. 1 and 2, the electrode system of a pulsed carbon dioxide laser comprises parallel main electrodes 10 and 11 having Rogowski profiles, with a pair of parallel tungsten wires 12 positioned between and parallel to but outside the centre line of the main electrodes 10 and 11 (the position of the wires can be seen more clearly by reference to FIG. 2) to form the auxiliary electrodes. One of the main electrodes 10 is the cathode whilst the other electrode 11 is the anode. Coupling capacitors 14 are connected between the auxiliary electrodes 12 and the cathode 10. A further capacitor 15 is connected between cathode 10 and one end of a triggered spark gap 16. The other end of the triggered spark gap 16 is connected to the anode 11. Capacitor 15 and triggered spark gap 16 form a capacitor discharge pulse generator.

Figure 3:
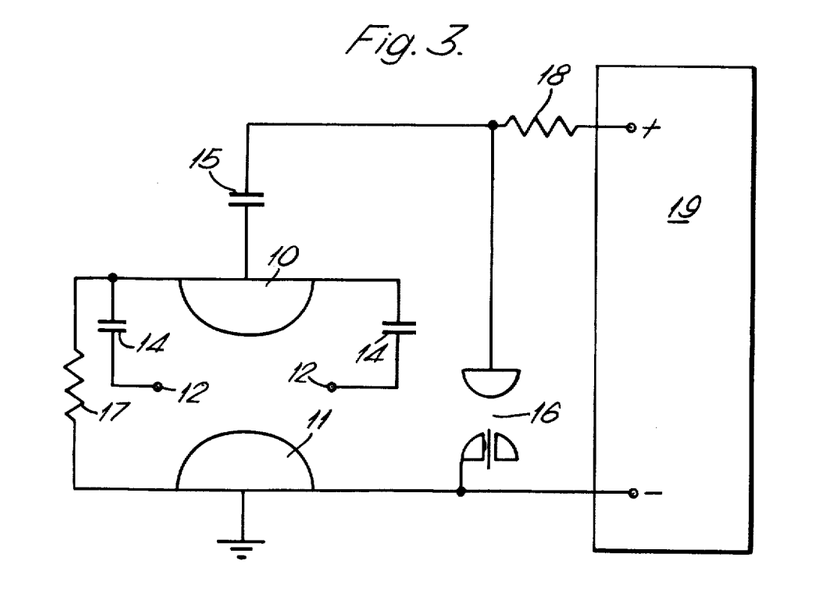
FIG. 3 shows the circuit arrangement of the electrode system of FIG. 1.

In FIG. 3, a high voltage power supply 19 is connected across the terminals of capacitor 15 through resistances 17 and 18. Resistor 17 is in parallel with the main electrodes 10 and 11. One side of capacitor 15 is connected to the cathode 10 of the main electrodes and to one terminal of resistor 17, the other terminal of capacitor 15 is connected to resistor 18, which in turn is connected to the high tension terminal of high voltage power supply 19. The second terminal of resistor 17 is connected to anode 11, which is earthed, and then to the second terminal of high voltage power supply 19. The combination of capacitor 15 together with main electrodes 10 and 11 paralled by resistor 17 is shunted by the spark gap 16. Further capacitors 14 link the cathode 10 with auxiliary electrodes 12.

In operation the high voltage power supply 19 charges capacitor 15 to a high voltage V through the resistors 17 and 18. The spark gap 16 is then triggered and becomes a virtual short circuit in the time of a few nanoseconds. This causes the charged capacitor 15 to appear across the anode 11 and cathode 10 placing a voltage of $-V$ on the cathode 10 with respect to the anode 11, thus a high voltage pulse of short duration is applied between the main electrodes 10 and 11. The auxiliary electrodes 12 are initially maintained at the same potential as the cathode 10 by the coupling capacitors 14. The auxiliary electrodes 12 thus behave as cathodes. As the applied voltage pulse rises in magnitude the field at the auxiliary electrodes 12 rises faster than that at the main cathode electrode 10 as a result of the high field concentration at the auxiliary electrodes. While the applied voltage pulse is still rising the field at the auxiliary electrodes 12 becomes sufficiently high to cause field emission. The electrons so produced then initiate a discharge over the whole length of each auxiliary line electrode 12 to the anode 11. These discharges then charge up the coupling capacitors 14 setting up fields between the auxiliary electrodes 12 and the cathode 10. These fields then extend the auxiliary discharges from the auxiliary electrodes 12 to the cathode 10. The auxiliary discharges initiate a uniform discharge between the main electrodes 10 and 11 over the whole area of the uniform field region.

The charging of the coupling capacitors 14 changes the potential of the auxiliary electrodes 12 from that of the main cathode electrode 10 towards the potential at their positions due to the field from the main electrodes 10 and 11, thus reducing any perturbing effect of the auxiliary electrodes on the main field. The main discharge continues uniformly until capacitor 15 is discharged.

It has been found advantageous in the arrangement shown in FIGS. 1 and 2 for the pair of auxiliary wire electrodes to lie in a plane parallel to the medial plane between the main electrodes and the basal plane of the anode; it is preferred that this plane is, in fact, the plane tangential to the surface of the anode.

For the system described with reference to FIGS. 1 to 3 typical values of components would be:

| | |
|---|---|
| Applied voltage | 50kV |
| Each Capacitor 14 | 200 pF |
| Capacitor 15 | 0.01 $\mu$F |
| Pulse duration | 100 nS |
| Resistor 17 | 5000$\Omega$ |

The value of the resistor 17 should be high enough to ensure that it is of high impedance compared to that of the main discharge.

It is emphasised, however, that these values are interrelated and will depend on the size and shape of the required discharge. The pulse duration is particularly critical and if too great, i.e., greater than a few hundred nanoseconds, the uniform discharge will deteriorate to one or more localised arcs. The pulse duration is dependent upon the size of capacitor 15, the inductance of the main discharge current loop and the impedance of the discharge. All these will depend upon the size of and shape of the discharge and the discharge impedence will depend upon the voltage and gas mixture. Whilst the values given are typical for one device, in other devices the parameters may vary by a magnitude or more.

The mechanism of initiation is not yet clear, but it is likely that a uniform distribution of photoelectrons is produced by ultra-violet radiation from the auxiliary discharge.

The laser output pulse shape has been measured for both multimode operation and when constrained to operate only in a single mode. In the multimode case, the pulse is some 100 nanoseconds half height, full width, with a 60 ns rise-time and a long tail, which under some conditions can contain a significant fraction of the pulse. At least part of the energy in the tail is due to lower gain modes. Under single mode operation, the pulse length shortens to 60 nanoseconds half height, full width, with a 40 nanoseconds rise-time. Spontaneous mode locking can occur under these conditions and the pulse shape then takes the form of a train of subnanosecond pulses.

FIGS. 4 – 8 show alternative electrode arrangements to that shown in and described in detail with reference to FIGS. 1 – 3.

Figure 4:
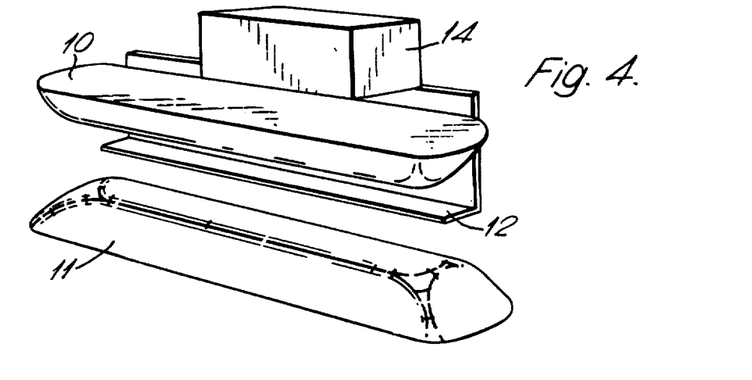
FIG. 4 is a perspective view of a second electrode system according to the invention.

In FIG. 4 the auxiliary electrode 12 comprises a sharp metallic edge positioned parallel to the main electrodes 10 and 11 but outside their centre line. A coupling capacitor 14 links the cathode 10 with the auxiliary electrode 12. Excitement of the system is achieved using the same system as shown in FIG. 3 with parallel wire auxiliary electrodes 12 being replaced by the sharp edge.

Figure 5:
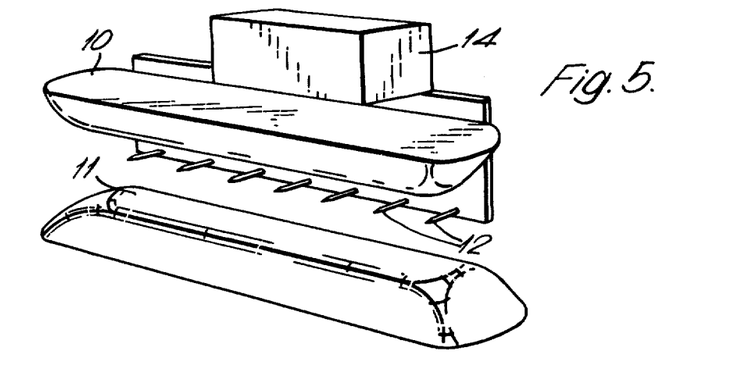
FIG. 5 is a perspective view of a third electrode system according to the invention.

In FIG. 5 the auxiliary electrode 12 comprises a row of pins positioned parallel to the main electrodes 10 and 11 but outside their uniform field region. Coupling capacitor 14 links the cathode 10 with the auxiliary electrode 12. Again excitement of the system is achieved using the system shown in FIG. 3 but with a row of pins being used as auxiliary electrode 12.

Figure 6:
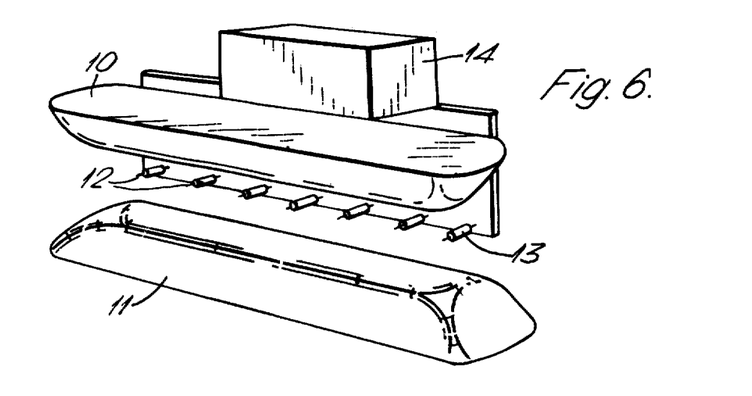
FIG. 6 is a perspective view of a fourth electrode system according to the invention.

In FIG. 6 the row of pins making up the auxiliary electrode 12 of the FIG. 5 are loaded by resistors 13.

The systems described with reference to FIGS. 1 – 6 initiate the main discharge between the main electrodes 10 and 11 by auxiliary discharges between one of a plurality of auxiliary electrodes 12 and either the anode 11 or cathode 10 or both. In the systems shown in FIGS. 7 (a and b) and 8 (a and b) the auxiliary discharges do not touch the main electrodes but occur between a plurality of electrodes outside the region between the main electrodes in which the main discharge takes place.

Figure 7A:
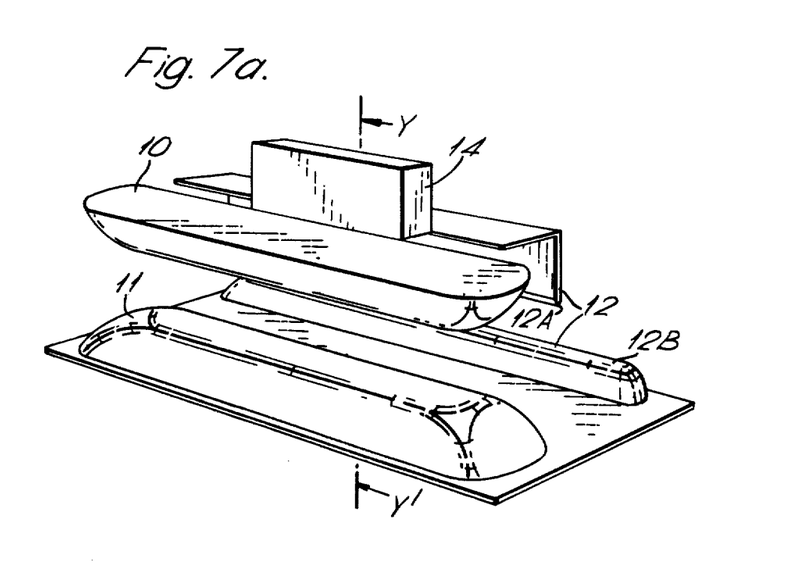
FIG. 7a is a perspective view of a fifth electrode system according to the invention.
Figure 7B:
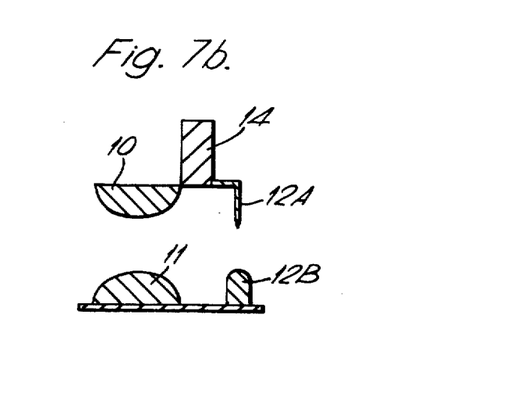

In FIGS. 7a and 7b the auxiliary electrodes 12 consist of an edge electrode 12A which is mounted alongside cathode 10 and is connected to cathode 10 through capacitor 14 and a Rogowski profiled auxiliary electrode 12B mounted adjacent to the anode 11. This system may be operated in conjunction with a spark gap triggered circuit similar to that shown in FIG. 3. A fast rising high voltage pulse of short duration is applied between the main electrodes 10 and 11; this is achieved by switching a capacitor (15 in FIG. 3) through the simple triggered spark gap (16 in FIG. 3). The auxiliary edge electrode 12A is initially maintained at the same potential as the main cathode electrode 10 by the coupling capacitor 14. The auxiliary edge electrode 12A thus behaves as a cathode with respect to the earthed auxiliary electrode 12B. As the applied voltage pulse rises in magnitude the field at the auxiliary edge electrode 12A rises faster than that at the main cathode electrode 10 as a result of the high field concentration at the auxiliary edge electrode 12A. While the applied voltage pulse is still rising, the field at the auxiliary edge electrode 12A becomes sufficiently high to cause field emission. The electrons so produced then initiate a discharge over the whole length of the auxiliary edge electrode 12A to the other auxiliary electrode 12B. This auxiliary discharge initiates a uniform discharge between the main electrodes over the whole area of the uniform field region. At the same time coupling capacitor 14 charges up to change the potential of the auxiliary edge electrode 12A from that of the main cathode 10 towards the potential at its position due to the field between the main electrodes from the main electrodes 10 and 11, reducing any perturbing effect of the auxiliary electrodes on the main field.

Figure 8A:
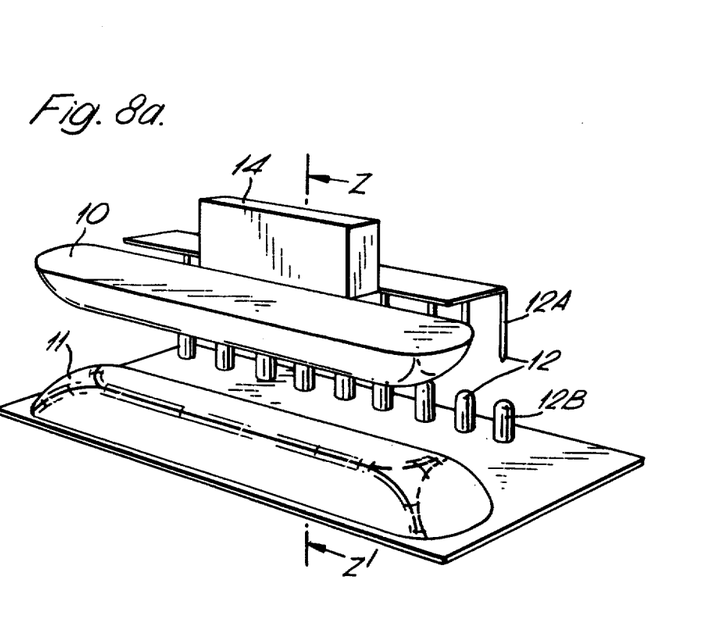
FIG. 8a is a perspective view of a sixth electrode system according to the invention.
Figure 8B:
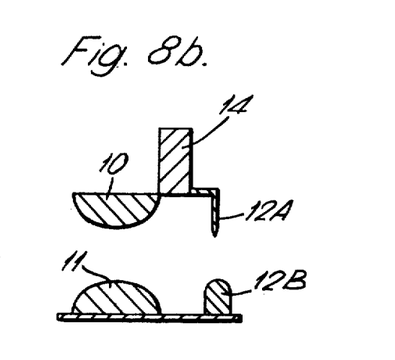
FIG. 8b is a medial section on the line ZZ' of the electrode system of FIG. 8.

FIGS. 8a and 8b show a development of the system shown in and described with reference to FIGS. 7a and 7b. In this embodiment the auxiliary electrodes 12 are made up of a row of pins 12a, positioned alongside and parallel to the cathode 10 of the main pair of electrodes 10 and 11, and a row of Rogowski profiled studs 12B positioned alongside the anode 11. The row of pins 12A is connected to the cathode 10 through capacitor 14 and the row of studs 12B connected to earth. The auxiliary and main discharges are initiated as described with reference to FIGS. 7a and 7b.

It is possible with the electrode systems shown in and described with reference to FIGS. 7 (a and b) and 8 (a and b) that the coupling capacitor 14 could be eliminated by aligning auxiliary electrodes 12A alongside the main cathode 10 such that its potential due to the field is equal to that of the cathode, in which case auxiliary electrode 12A may be connected directly to the cathode 10.

The design of the discharge initiation circuit is not restricted to that shown in and described with reference to FIG. 3; many alternatives have been published generally under the heading of "pulse-modulators." Examples may be found in literature on radar transmitters and nuclear experiments. Various forms of electrical delay line can be used in place of the capacitor; more sophisticated switches such as thyratrons or ignitrons and even semiconductor devices could be used instead of the spark gap. The use of pulse transformers in such systems is also well known.

The invention has been described employing a pair of Rogowski profiled main electrodes but it is not restricted to this configuration. Pairs of electrodes profiled with simple radii could be used, as may a single profiled electrode opposite a much larger plane electrode. The only restrictions on the electrode shapes are that a region of reasonably uniform field should be produced between them and that the discharge takes place only in this region.

The peak powers obtained from atmospheric pressure lasers are of the order of tens of megawatts and when focused, the electromagnetic fields are high enough to produce electrical breakdown in the air very readily. Since the pulsed energies are proportional to the volume of excited gas, it is possible to extrapolate to energies of at least 1 kJ from large devices and indeed 130 Joules has recently been obtained.

The pulse repetition rate of pulsed $CO_2$ lasers is limited by the rise in temperature of the gas. However, if the mixture is replaced for each pulse, the next fundamental limit to the repetition rate is the delay between the current pulse and the laser output pulse which is of the order of 1 $\mu s$.

It is clear, however, that the invention is in no way restricted to pulsed atmospheric pressure carbon dioxide lasers. It can be used in other gas lasers at pressures above and below atmospheric and has applications for other devices requiring uniform pulsed gas discharges.

In the arrangements of auxiliary electrodes described the auxiliary discharge commences as a result of field emmision from the auxiliary cathode. It will be found advantageous in certain applications, particularly where lasering action in low pressure inert gases is required, for the auxiliary cathodes to be heated so inducing thermionic emmision from their surfaces.

I claim:

1. In a transverse excitation system for a pulsed high pressure molecular gas laser having a resonant cavity where the transverse excitation system includes:
   a. a pair of elongate main discharge electrodes extending longitudinally of said laser cavity and mounted in spaced planes parallel to each other, one of said main discharge electrodes being a cathode, the other of said main discharge electrodes being and anode, each of said main discharge electrodes having active surface portions facing each other, said electrodes defining therebetween a main discharge region for a molecular gas occupying said region; the improvement comprising:
   b. at least one elongate conducting auxiliary discharge electrode extending longitudinally of said laser cavity, disposed between said spaced planes but outside said main discharge region, each of said elongate auxiliary discharge electrodes having a constant spatial separation along its length from said cathode, each of said auxiliary discharge electrodes being separated from said main discharge electrodes only by said molecular gas;
   c. an electric conducting circuit including an energy limiting means connected between at least one auxiliary discharge electrode and one of said main discharge electrodes;
   d. high voltage pulse generating means connected between the said main discharge electrodes;
   e. said energy limiting means being operative to produce a potential difference between at least one of said auxiliary discharge electrodes and each of said main electrodes on operation of said high voltage pulse generating means;
   f. said potential difference between at least one of said auxiliary discharge electrodes and each of said main electrodes being operative to induce an auxiliary discharge between at least one of said auxiliary discharge electrodes and at least one of the main discharge electrodes, said auxiliary discharge serving to ionize molecular gas in the region in which a main discharge takes place prior to the initiation of discharge between the said main discharge electrodes.

2. An excitation system for a gas laser according to claim 1 wherein said energy limiting means comprises at least one capacitor.

3. An excitation system for a gas laser according to claim 1 wherein said at least one auxiliary discharge electrodes comprises parallel wires.

4. An excitation system for gas lasers according to claim 1 wherein said at least one auxiliary discharge electrode is tapered to a fine edge.

5. An excitation system for gas lasers according to claim 1 wherein said at least one auxiliary discharge electrode comprises at least one row of pins.

6. An excitation system for a gas laser according to claim 5 wherein said pins are loaded by resistors.

7. In a transverse excitation system for a pulsed high pressure molecular gas laser having a resonant cavity which transverse excitation system includes:
   a. a pair of elongate main discharge electrodes extending longitudinally of said laser cavity and mounted in spaced parallel planes, one of said electrodes being a cathode, the other being an anode, each of said electrodes having active surface portions facing each other and defining therebetween a main discharge region for molecular gas, said region being a volume of molecular gas contained between said active surface portions; the improvement comprising:
   b. at least one elongate auxiliary discharge cathode extending longitudinally of said laser cavity, between said parallel planes but outside said main discharge region, each of said auxiliary discharge cathodes having a constant spatial separation along its length from said main discharge cathode, each of said auxiliary discharge cathodes being separated from said main discharge cathode only by said molecular gas;
   c. an electric conducting circuit including energy limiting means connected between said auxiliary discharge cathodes and said main discharge cathode;
   d. at least one elongate auxiliary discharge anode extending longitudinally of said laser cavity disposed adjacent said main discharge anode outside said main discharge region, each of said auxiliary discharge anodes having a constant spatial separation along its length from said main anode, and being separated from said main anode only by said molecular gas, and each being electrically connected to said main discharge anode;

e. high voltage pulse generating means connected between the said main discharge cathode and said main discharge anode;

f. said energy limiting means providing a potential difference between said auxiliary discharge cathodes and said auxiliary discharge anodes on operation of said high voltage pulse generating means, said potential difference inducing an auxiliary discharge between said auxiliary discharge cathodes and said auxiliary discharge anodes, said auxiliary discharge ionizing said molecular gas in said main discharge region prior to the initiation of the discharge between said main discharge electrodes.

8. An excitation system for a gas laser according to claim 7 wherein said energy limiting means comprises at least one capacitor.

9. An excitation system for gas lasers according to claim 7 wherein the at least one auxiliary discharge anodes and said anode are equipotential.

10. An excitation system for gas lasers according to claim 7 wherein the at least one auxiliary cathode is tapered to a fine edge.

11. An excitation system for gas lasers according to claim 10 wherein the at least one auxiliary discharge anode have Rogowski profiles.

12. An excitation system for gas lasers according to claim 7 wherein the at least one auxiliary discharge cathode comprises a row of pins.

13. An excitation system for gas lasers according to claim 12 wherein the at least one auxiliary discharge comprises at least a row of studs, each stud opposite a pin of the at least one auxiliary discharge electrode.

14. An excitation system for gas lasers according to claim 1 wherein the said auxiliary electrodes are coplanar with the tangential plane of the anode of said main discharge electrodes, which tangential plane is parallel to said parallel planes in which said main discharge electrodes are mounted.

15. An excitation system for gas lasers according to claim 1 wherein said main discharge electrodes include Rogowski profiles.

16. An excitation system for gas lasers according to claim 7 wherein said main discharge electrodes include Rogowski profiles.

* * * * *